Oct. 13, 1936.   J. S. CLAPPER   2,057,417
GANG LAWN MOWER
Filed July 18, 1931   8 Sheets-Sheet 1

INVENTOR
JOHN S. CLAPPER
BY Paul, Paul & Moore
ATTORNEYS

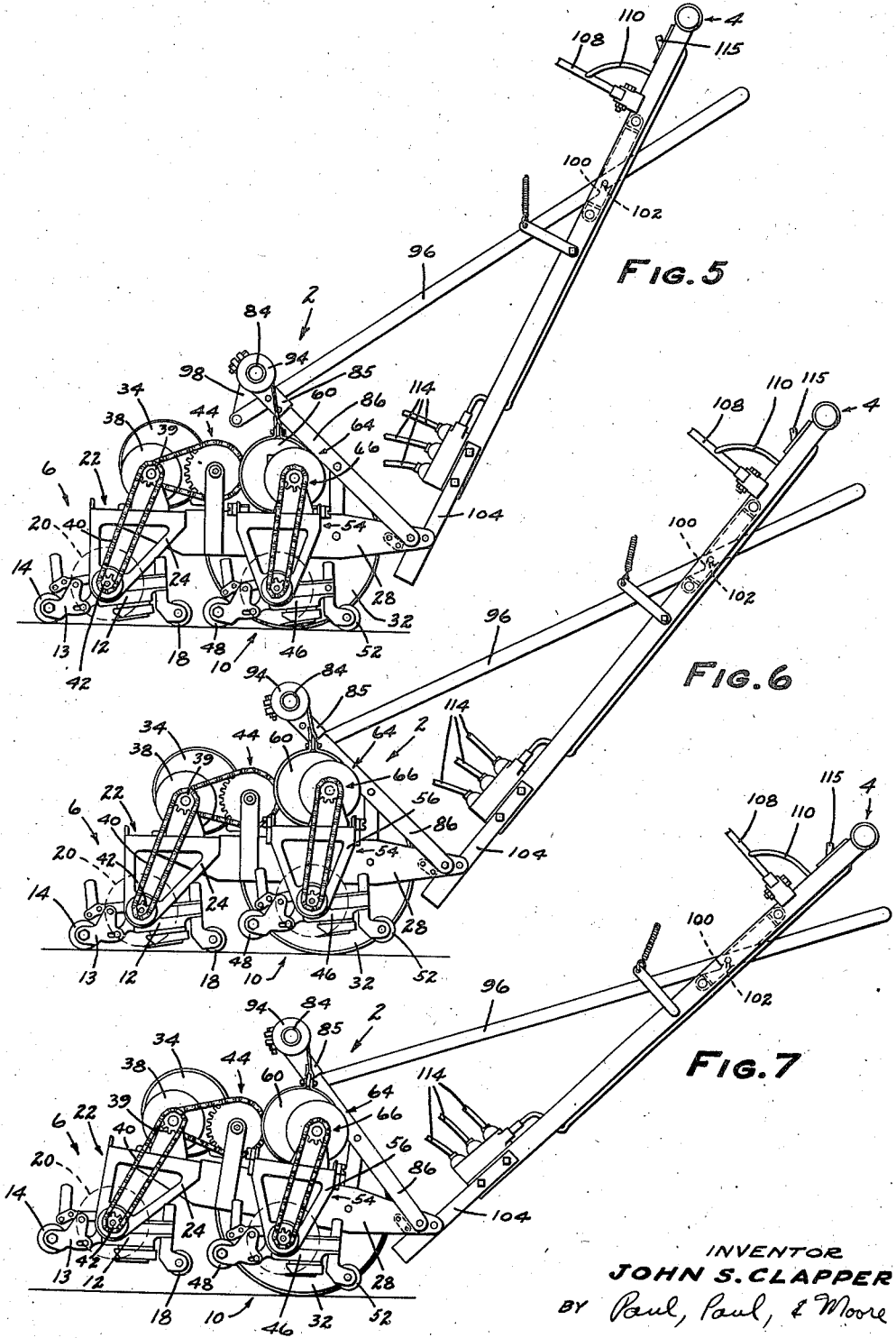

Oct. 13, 1936.                J. S. CLAPPER                 2,057,417
                             GANG LAWN MOWER
                           Filed July 18, 1931              8 Sheets-Sheet 4
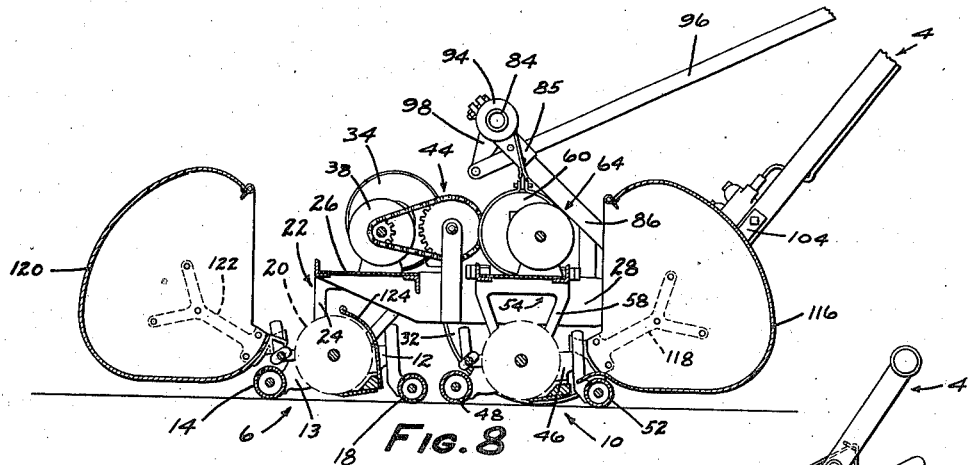
FIG. 8
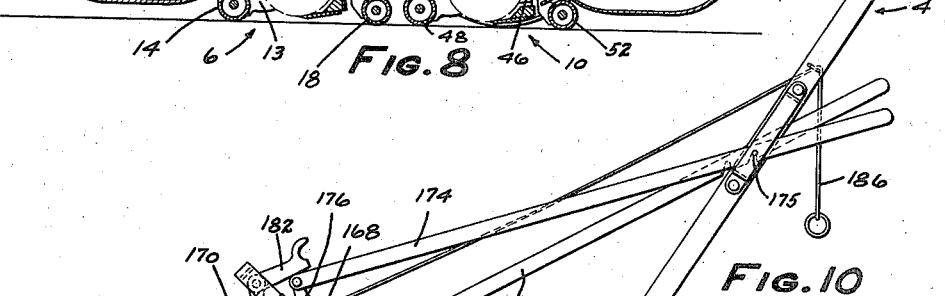
FIG. 10
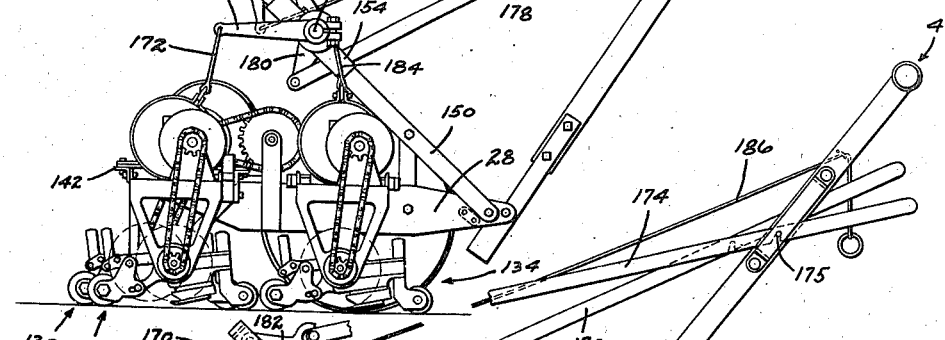
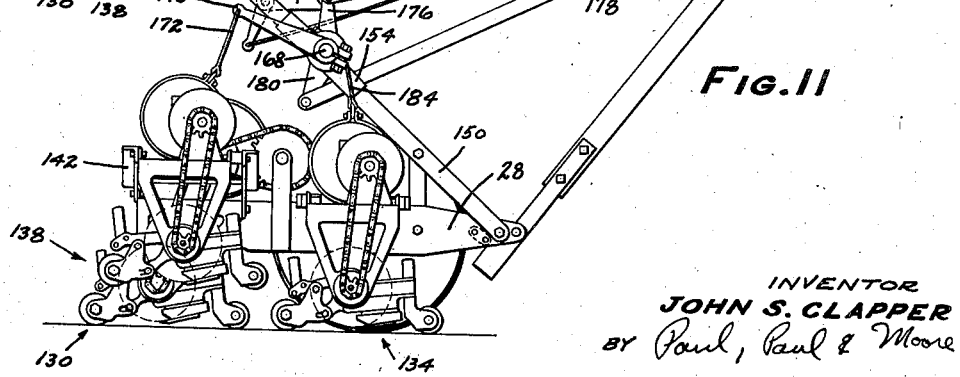
FIG. 11
INVENTOR
JOHN S. CLAPPER
BY Paul, Paul & Moore
ATTORNEYS

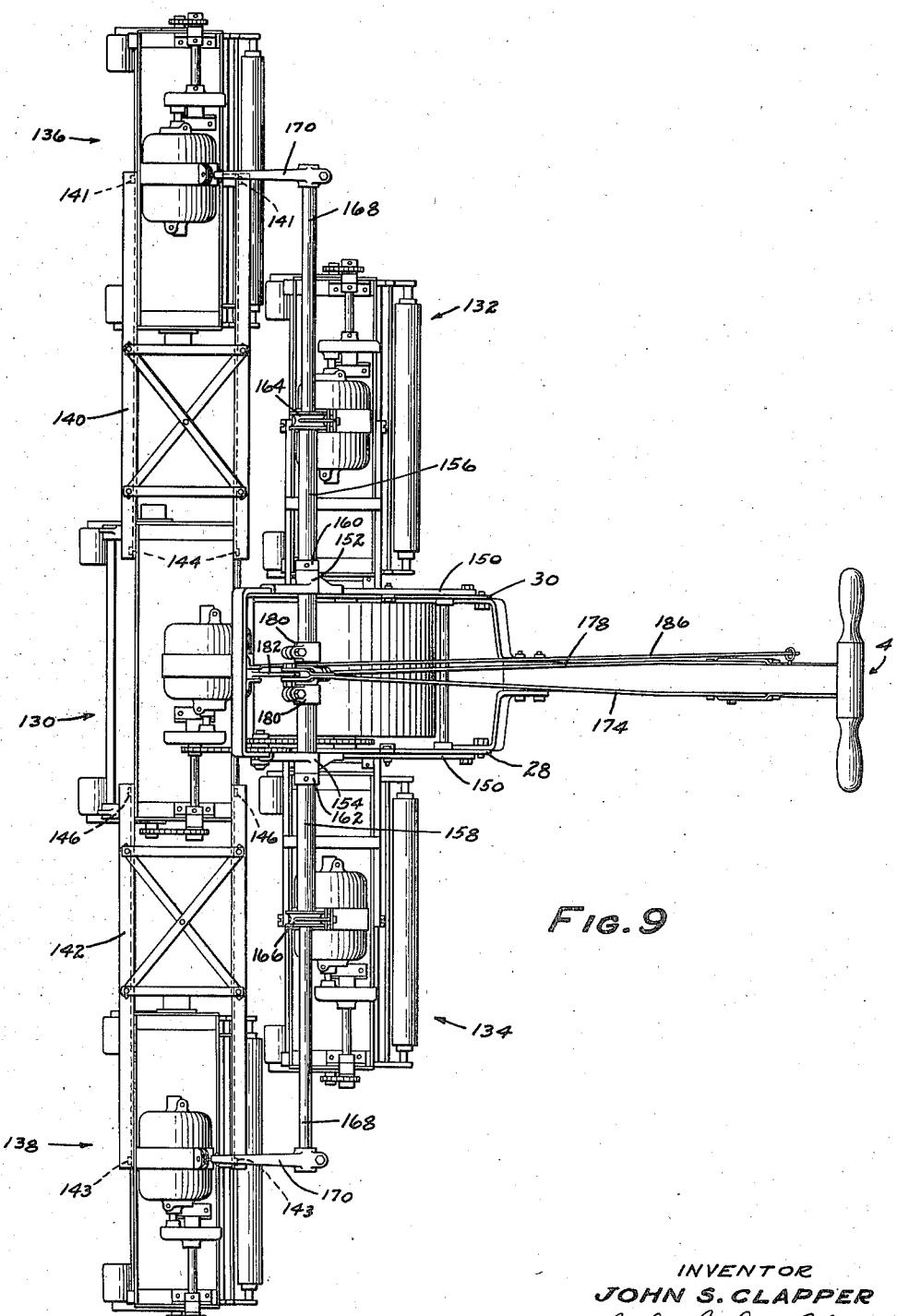

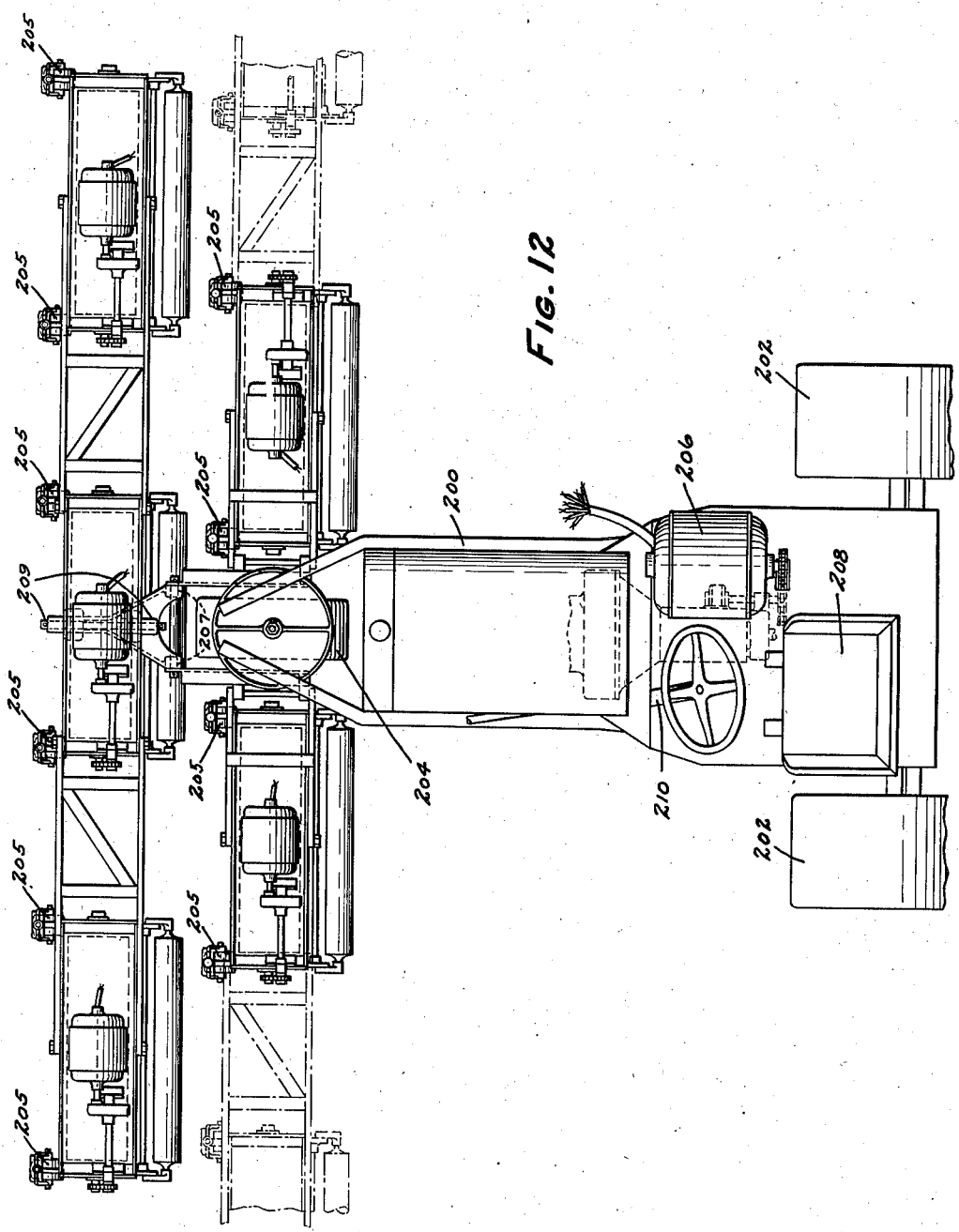

Oct. 13, 1936.   J. S. CLAPPER   2,057,417
GANG LAWN MOWER
Filed July 18, 1931   8 Sheets-Sheet 7

INVENTOR
JOHN S. CLAPPER
BY Paul, Paul & Moore
ATTORNEYS

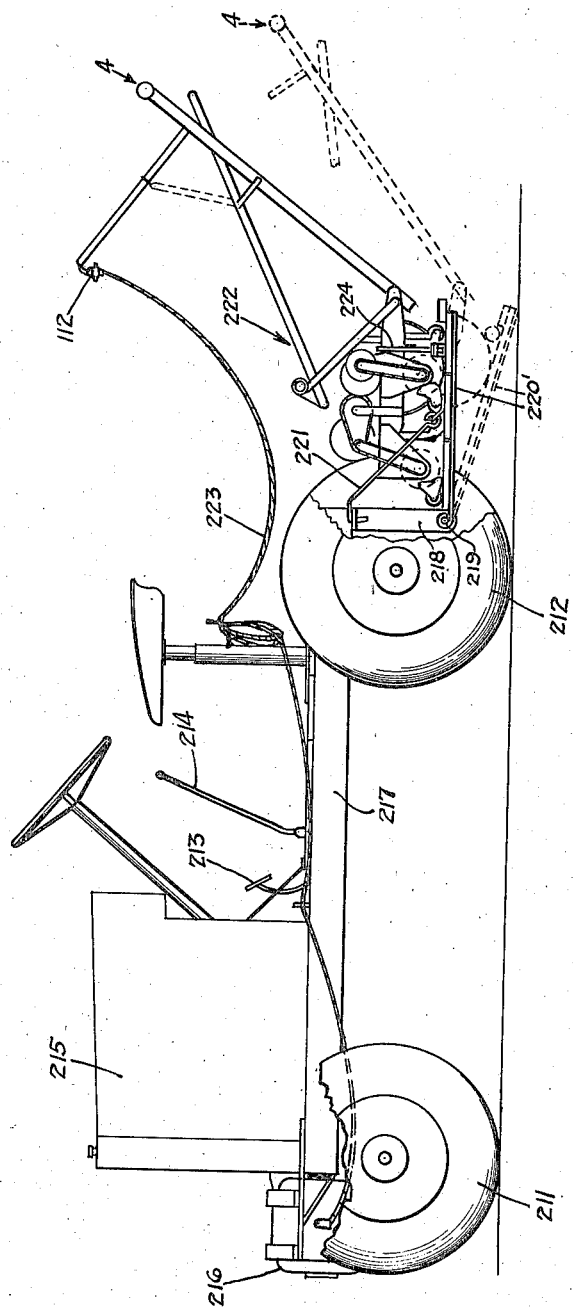

Patented Oct. 13, 1936

2,057,417

UNITED STATES PATENT OFFICE 2,057,417

GANG LAWN MOWER

John S. Clapper, Minneapolis, Minn., assignor to Toro Manufacturing Company, Minneapolis, Minn., a corporation of Delaware Application July 18, 1931, Serial No. 551,638

47 Claims. (Cl. 56—7)

This invention relates to improvements in lawn mowers and more particularly to gang lawn mowers provided with a plurality of lawn mower units arranged to cut a composite swath wider than their individual swaths. Gang lawn mowers of this type may be used in cutting the grass in parks, fairways and putting greens of golf courses, etc.

A general object of the present invention is the provision of a simplified gang lawn mower construction in which both the cutters of the individual lawn mower units are rotated and the gang is propelled by means of electric power.

Another general object of the invention is the provision of a gang lawn mower construction enabling a close spacing between front and rear transverse rows of units so that the only flexibility required in the connections between the units is such as to permit relative oscillation in vertical planes, no lateral horizontal swinging of any of the units being required since they are so closely spaced as to permit moving around curves without leaving uncut strips and without damage to the turf, inasmuch as very little lateral skidding of the rolling elements carrying the units takes place.

A further object of the invention is a gang lawn mower construction wherein each of the mower units is provided with an individual electric motor and in which all of the units with the exception of the front center unit do not require traction members.

Another object is the provision of a gang lawn mower so constructed that each of the units may be provided with a grass catcher, without increasing fore and aft spacing between the cutters of the gang.

Still another object is a lawn mower construction in which the various units are readily detachable.

The novel features of the invention may be embodied in a hand controlled gang and also in a tractor propelled gang of lawn mowers.

It is an additional object of the invention to provide a hand controlled gang in which all of the units are similar with the exception of the front center unit which is arranged with means to propel the gang, the traction means being confined to a divided drive drum on the center unit.

It is also an object to provide means on the handle of the hand operated gang for conveniently positioning the cable through which current is supplied to the individual motors, during the operation of the gang.

The hand controlled gangs are particularly useful on putting greens and the like where a source of electric energy is available, but in order to enable their use at stations where there are no fixed current connections, the invention further contemplates the provision of a vehicle for transporting the hand operated gang from station to station, and which carries a generator for generating the necessary current for operation of the gang at any selected point.

It is also an object of the invention to provide simplified means for lifting the cutters of the individual units of the hand controlled gangs from the ground in order to facilitate turning, and in order to facilitate movement of the gang without the operation of the cutters.

For more extensive cutting, the invention further contemplates the provision of an arrangement wherein the electrically operated cutting units are mechanically pushed or pulled along by a tractor which propels the units and carries an electric generator for operating the motors and cutting elements. The lawn mower units used in gangs of this type are ordinarily larger than those used on the hand controlled gangs and are conveniently provided with caster wheels to further facilitate movement around curves.

The various objects and novel features of the invention will become more readily apparent upon a detailed study of the accompanying specification and drawings, together with the appended claims.

In the drawings, which are illustrative of the invention, Fig. 1 is a plan view of a three-unit hand controlled gang;

Fig. 5 is a side elevation of the gang shown in Fig. 1 with the slot in the lifting bar shown in engagement with the stop on the handle, all of the mower units resting upon the ground;

Fig. 6 is a view similar to that shown in Fig. 5, the handle being depressed a sufficient amount to raise the rear side mower units;

Fig. 7 is a view similar to that shown in Fig. 5 and illustrating the relative positions of the parts when the handle is depressed a sufficient amount to raise all of the mower units from the ground;

Fig. 8 is a cross-section showing the grass catchers in place;

Fig. 9 is a plan view of a five-unit hand controlled gang;

Figs. 10 and 11 are side elevations of the gang shown in Fig. 9, and illustrating the relative positions of the parts during operation of the lifting mechanism;

Fig. 12 is a plan view of a five-unit tractor propelled gang; and

Fig. 14 is a side elevation of a "parent" vehicle for use in connection with a hand controlled gang mower when it is desired to mow various separated areas of grass where electric power connections are not available, such as putting greens on golf courses.

Figure 1:
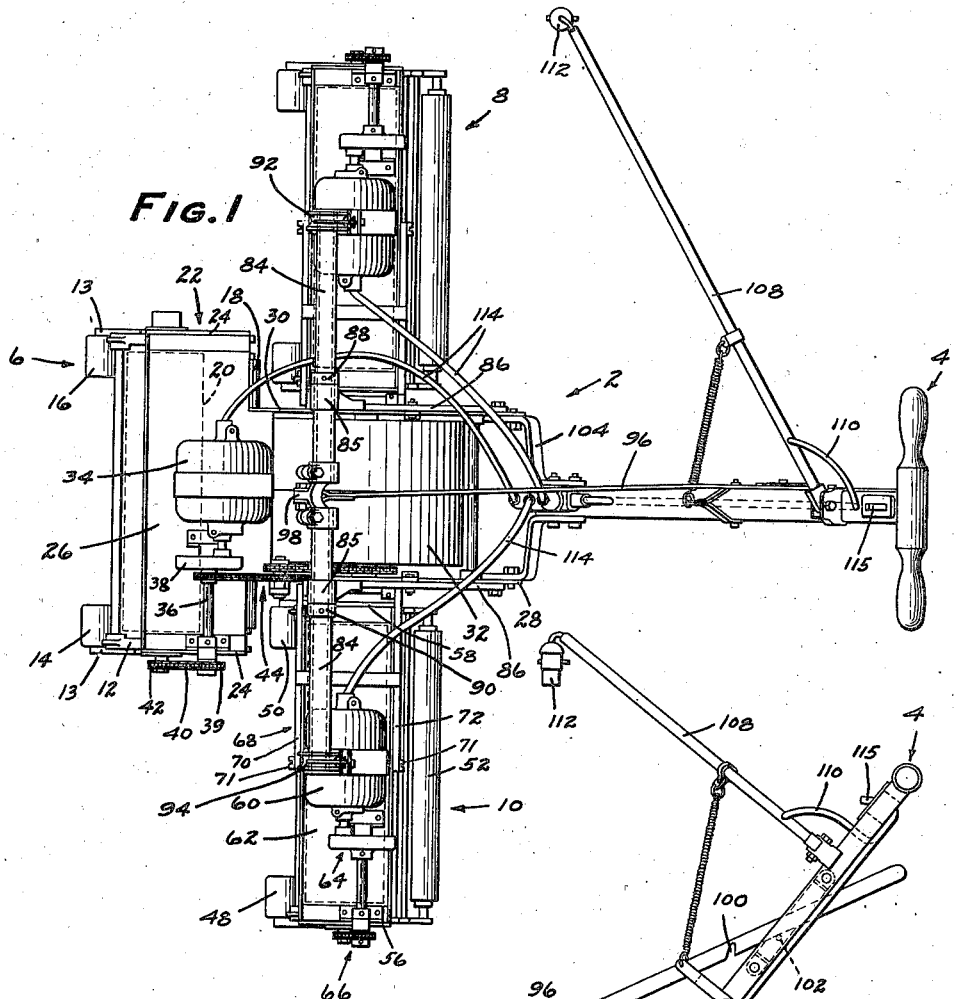

Referring to the drawings, and more particularly to Figs. 1 to 8, the numeral 2 designates a three-unit hand controlled gang provided with a handle generally designated at 4 by means of which the operator directs and steers the gang while walking behind it. The gang comprises a front row having in this case only a front center mower unit 6 and a rear row having a pair of rear side mower units 8 and 10, all being arranged as shown to cut a composite swath having a width substantially equal to the sum of the lengths of the three mower units. The front center mower unit 6 comprises a cutter frame 12 provided with front rollers 14 and 16 carried on adjustable brackets 13, and a rear wiper roller 18, which supports it from the ground. The cutter frame carries a bed knife and a revolving reel indicated by the dotted lines at 20. A super frame, generally designated at 22, is provided with a pair of depending arms 24 which are pivoted to the cutter frame 12 about an axis coincident with that of the reel 20. The top 26 of the front center unit super frame 22 is provided with a pair of longitudinally extending arms 28 and 30 which are pivoted to the divided drive drum 32 about its axis. A motor 34 is mounted upon the top and drives a short shaft 36 through the reduction gearing 38. The short shaft 36 carries a pinion 39 which drives the pinion 42 fixed to the shaft of reel 20 by means of the chain 40. The drive drum 32 is also driven from motor 34 by means of the chain drive generally designated at 44. Motor 34 therefore supplies the power for rotating the reel 20 of the front center mower unit and for also rotating the drive drum 32 which propels the entire gang.

The rear side mower units 8 and 10 are similar in structure and it will therefore only be necessary to describe one. The unit 10 comprises a cutter frame 46, similar to the cutter frame of the front center unit, and which is supported from the ground by means of front rollers 48 and 50, and a rear wiper roller 52. The cutter frame carries the usual reel and bed knife as in the front center unit. In fact the complete cutter and cutter frame assembly for the rear side units are of identical construction and interchangeable with the corresponding assembly of the front center unit. A unit super frame generally designated at 54 is provided with depending arms 56 and 58 which are pivoted to the cutter frame about an axis coincident with that of the reel. A motor 60 is secured and mounted on the top 62 of the unit super frame 54 and is arranged to drive the reel through the reduction gearing generally designated at 64 and the chain drive generally designated at 66, as will be apparent from Figs. 3 and 4.

Figure 3:
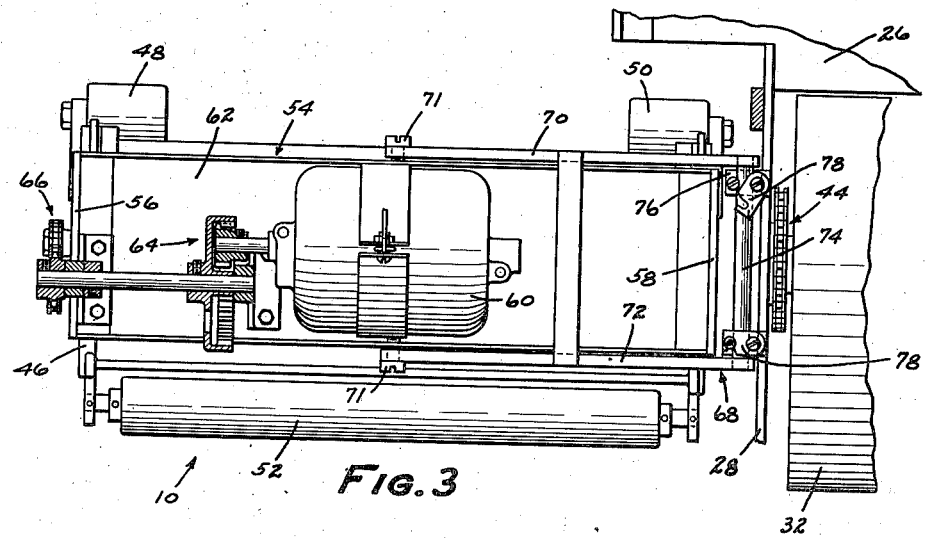
Fig. 3 is an enlarged plan view of one of the rear side units of the gang shown in Fig. 1, some parts being shown in horizontal cross-section.
Figure 4:
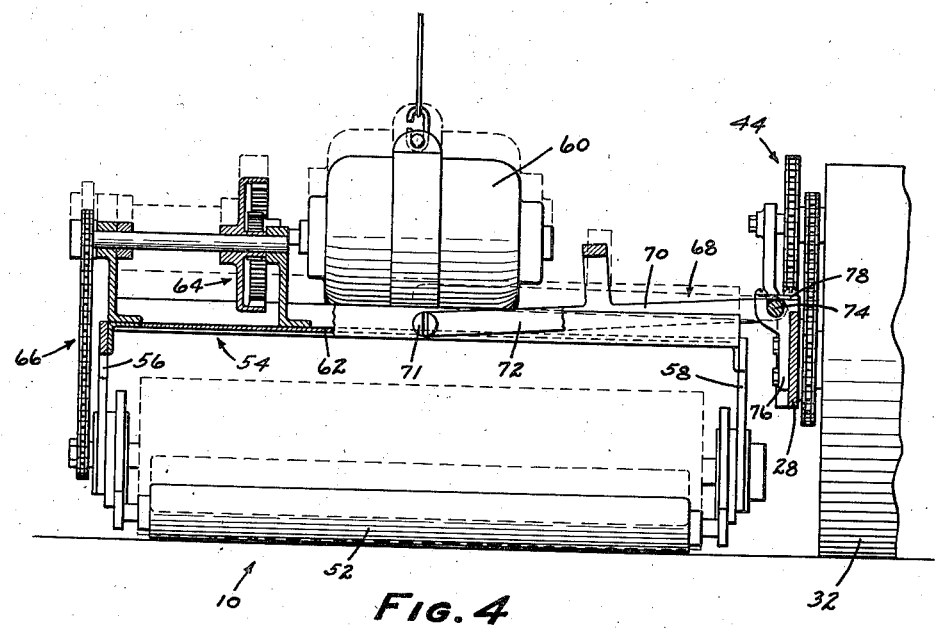
Fig. 4 is a vertical longitudinal section through the unit shown in Fig. 3.

The rear side unit 10 is connected to the front center unit super frame 22 by means of an extension frame generally designated at 68. The extension frame 68 is in the general form of an H having legs 70 and 72, and a crossbar 74. As shown in Figs. 3 and 4, the free ends of legs 70 and 72 are pivoted to the sides of the super frame 54 at about its center as at 71. These legs extend beyond the end of the super frame and their connecting crossbar 74 is pivoted in the slots provided by a pair of uprights 76 which are firmly secured to the longitudinally extending arm 28 of the front center unit super frame 22. The uprights 76 are provided with pivoted latch members 78 for holding the crossbar 74 in the slots. The rear side mower unit 8 is connected to the front center unit super frame 22 in a similar manner.

It will be noted that the cutter frame of the front center mower unit 6 is free to pivot with respect to the super frame 22 about the axis of its reel which is transverse to the direction of movement of the gang. Each of the rear side units is free to pivot as a whole about the axis of its crossbar 74 which is longitudinal to the direction of movement of the gang. So also, each of the side rear units is free to pivot about a second longitudinal axis extending through the pivot points 71. The cutter frames of the rear side units are also free to pivot about an axis transverse with respect to the path of movement and coincident with the axes of their reels.

It will further be observed that the traction means are confined to the divided drive drum 32 which propels the entire gang, the power for revolving the individual cutting reels being supplied by the individual motors. When the motors are in operation, the motor 34 supplies the power for propelling the entire gang and also drives the reel 20, the remaining motors driving their respective cutting reels only. As the gang advances, the cutter frame 12 of the front center unit is free to pivot about the axis of its reel upon striking irregularities in the ground being mowed and the rear side units are each capable of tilting about two longitudinal axes and one transverse axis as described above.

Since the propelling means is confined to the drive drum 32 behind the front center unit, the remaining units have no traction members and the over-all length of the gang from front to rear can accordingly be made very short so that the rear row of the units is very close to the front center unit. As a consequence, the gang can be moved around curves without leaving uncut strips and without damaging the turf since very little skidding of the rolling elements which carry the units takes place. In this construction it is not necessary to provide means for a lateral horizontal swinging of any of the individual units.

In order to facilitate turning of this hand controlled gang, means are provided for conveniently lifting the units. These means comprise a shaft 84 rotatably mounted in bearings 85 carried by the standards 86 which are mounted rigidly with respect to the arms 28 and 30 of the front center unit super frame 22. Collars 88 and 90 are fixed on the shaft, adjacent the bearings 85, to secure it against lateral movement. Pulleys 92 and 94 are fixed to the shaft at its ends, each being just above one of the motors on the rear side mower units 8 and 10. Each pulley has a cable fixed thereto at one end. The other end of each cable is secured to one of the motors on the units 8 and 10. A lifting bar 96 is pivoted at one end to an arm 98 fixed on the shaft 84, and is provided adjacent its other end with a slot 100 which is adapted to engage a pin 102 fixed on the handle 4 adjacent its upper end. The lower end of handle 4 is provided with a fork 104 whose ends are pivoted to the outer ends of the arms 28 and 30 of the front center unit super frame 22. These arms 28 and 30 are provided with stops for limiting the downward inclination of handle 4 with respect to the front center unit super frame.

Figure 2:
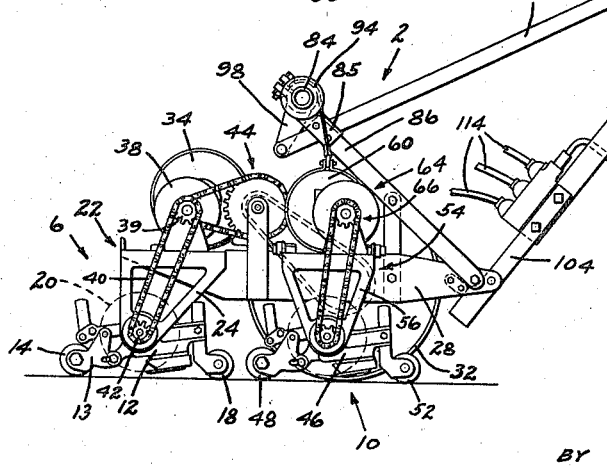
Fig. 2 is a side elevation of the gang shown in Fig. 1.

In the ordinary operation of the device, when it is not desired to lift any of the mower units, the slot 100 of the lifting bar 96 is disengaged from the pin 102 as shown in Fig. 2, but when the operator desires to lift any of the units, as for instance when turning, he pushes the handle upwardly into the position shown in Fig. 5 whereupon the pin 102 and slot 100 will come into engagement. If the operator then depresses the handle into the position shown in Fig. 6, the lifting bar 96 will be pulled downward with the handle and consequently rotate the arm 98 and shaft 84 in counter-clockwise direction. The pulleys 92 and 94 will rotate with shaft 84, the cables carried by the pulleys will be drawn upwardly, and the rear side mower units 8 and 10 will be drawn upwardly, as indicated by the dotted line position shown in Fig. 4, and the full line position shown in Fig. 6. If the operator then depresses the handle into the position shown in Fig. 7, the front center unit super frame and consequently the entire front center unit will be tilted about the axis of the drive drum and also be lifted clear of the ground. This arrangement enables the operator to readily and selectively raise only the rear side units, or all of the units.

A rigid conduit 108 is pivoted to the handle 4 for rotation in a plane substantially perpendicular to its axis. An electrical conductor 110 connected to the socket 112 passes through this conduit and down the handle 4 whereupon it branches into a plurality of leads 114 leading to the various individual motors of the gang. The switch 115 of the handle 4 controls the current flow to the motors. The socket 112 communicates with any convenient electrical source by means of a conductor cable (not shown). As the gang proceeds during operation, the rigid conduit 108 serves to hold the cable leading to the electrical source to one side, and therefore prevents its becoming entangled with the mechanism of the cutters or with the operator's feet. As the operator turns the gang and proceeds in reverse direction to cut the next swath, he can conveniently swing the lead-in cable to the opposite side by merely swinging the rigid conduit 108 about its pivot.

The arrangement permits of the employment of grass catchers, such as are commonly employed for removing the clippings from putting greens, without the catchers themselves interfering with the close spacing of the rows of mower units and without the necessity of any structural differences between the front and rear cutting units. As shown in Fig. 8, the rear units are provided with catchers 116 which are mounted upon the rear of the cutter frames by means of brackets 118. These catchers collect and retain the clippings which are thrown backwards over the bed knife bar. The center front unit is provided with a catcher 120 mounted on the front of the cutter frame 12 by means of brackets 122. The clippings of the front unit are carried around the reel by the imparted wind velocity resulting from the provision of the shield 124, and are thrown into the catcher 120 on the front. Shield 124 extends longitudinally of the cutting reel and is mounted on the cutter frame 12 in any convenient manner.

Figs. 9, 10 and 11 illustrate a five-unit hand controlled gang having three units in its front row. Referring to these figures, the numeral 130 designates generally a front center unit similar to the unit 6 of the gang shown in Fig. 1, and numerals 132 and 134 designate side rear units similar to the units 8 and 10 shown in Fig. 1. The super frame of the front center unit 130 is pivotally connected to the drive drum about its axis, just as in the three-unit gang, and the connections between the mower units 132 and 134 and the super frame of unit 130 are the same as those between the units 6, 8, and 10 in Fig. 1.

In the five-unit gang, the front row is provided with additional end mower units generally designated at 136 and 138. These end units are identical in structure with the units 132 and 134 and are connected to the super frame of unit 130 by means of extension frames 140 and 142 which are provided with reinforcing cross braces as shown. One end of the extension frame 140 is pivotally connected to the super frame of the front end unit 136 at about its center as indicated at 141, and the other end of extension frame 140 is pivotally connected to the super frame of the center front unit 130 at 144. So also, one end of extension frame 142 is pivotally connected to the super frame of the side front unit 138 at about its center, as indicated at 143, and its other end is pivotally connected to the super frame of the unit 130 as at 146.

The units 136 and 138 are thus free to pivot about their pivots 141, 143, 144 and 146 which are all longitudinal with respect to the movement of the gang. Since the construction of these units is identical with that of units 132 and 134, their cutter frames are capable of pivoting about a transverse axis coincident with that of their reels. The units 136 and 138 are free to move to the same extent as units 132 and 134.

Means for conveniently lifting the units, which are somewhat similar to the lifting means employed in the three-unit gang described above, are further provided. The standards 150, which are rigidly secured with respect to the rearwardly extending arms 28 and 30, carry bearings 152 and 154 for a pair of sleeves 156 and 158. The sleeves are provided with collars 160 and 162 to prevent lateral movement. Sleeve 156 carries a pulley 164 at its outer end and sleeve 158 carries a similar pulley 166. Extending through the sleeves is a continuous shaft 168 which has arms 170 fixed thereto at its ends. These arms are located adjacent the motors on the front end units 136 and 138 and are connected thereto by means of links 172. Two lifting bars are provided for co-operation with the handle 4. Numeral 174 designates the first of these lifting bars which is pivotally connected at one end to an arm 176 fixed to the shaft 168 at a point between the sleeves 156 and 158. Bar 174 is provided with a slot adjacent its other end for co-operation with a pin 175 carried on the handle 4. The second lifting bar 178 is pivotally connected at one end to a pair of arms 180 which are fixed to the adjacent ends of sleeves 156 and 158, and is provided adjacent its other end with a slot for co-operation with pin 175.

When the operator desires to lift the various units, he first tilts the handle until the slot in the lifting bar 174 is engaged by the pin carried on the handle as shown in Fig. 10. The operator then presses the handle downwardly with the result that bar 174 will be drawn back and arm 176 rotated in clockwise direction until the parts assume the relative positions shown in Fig. 11. A dog 182 is pivoted to an extension on the standards 150 and holds the arm 176 in the position shown in Fig. 11. As a result of the rotation of arm 176 from the position shown in Fig. 10 to the position shown in Fig. 11 the shaft 168 is correspondingly rotated, the arms 170 are rotated, and the front end units 136 and 138 are lifted from the ground as will be evident from Fig. 11.

If the operator now desires to also lift the rear side units 132 and 134, he disengages the bar 174 from the pin carried by the handle, lever 176 being maintained in the position shown in Fig. 11 by the dog 182, and tilts the handle until the pin is in engagement with the slot provided in bar 178. The operator then again depresses the handle as a result of which the arms 180 are rotated in counter-clockwise direction and as a result of which the sleeves and the pulleys 164—166 will also be rotated to lift the units 132—134 by means of the cables 184. If the operator then further depresses the handle 4 its lower end will engage the stops on the arms 28 and 30, and the entire super frame of the front center unit 130 will be pivoted about the axis of the drive drum. At this point all of the units will be lifted from the ground.

When the operator is ready to return the units to the ground, he lets the handle up until the center front unit 130 and the rear units 132—134 are both on the ground whereupon he disengages the bar 178 from the pin 175 carried by the handle. The front end units 136—138 are at this stage still being held in elevated position by the dog 182 and the operator will thereupon again place the pin 175 in engagement with the slot in bar 174 and press the handle down until the pressure of arm 176 against the dog 182 is overcome. The operator then pulls the release cord 186 in order to raise the dog and then allows the handle to rise until the front end units are again on the ground.

Figure 13:
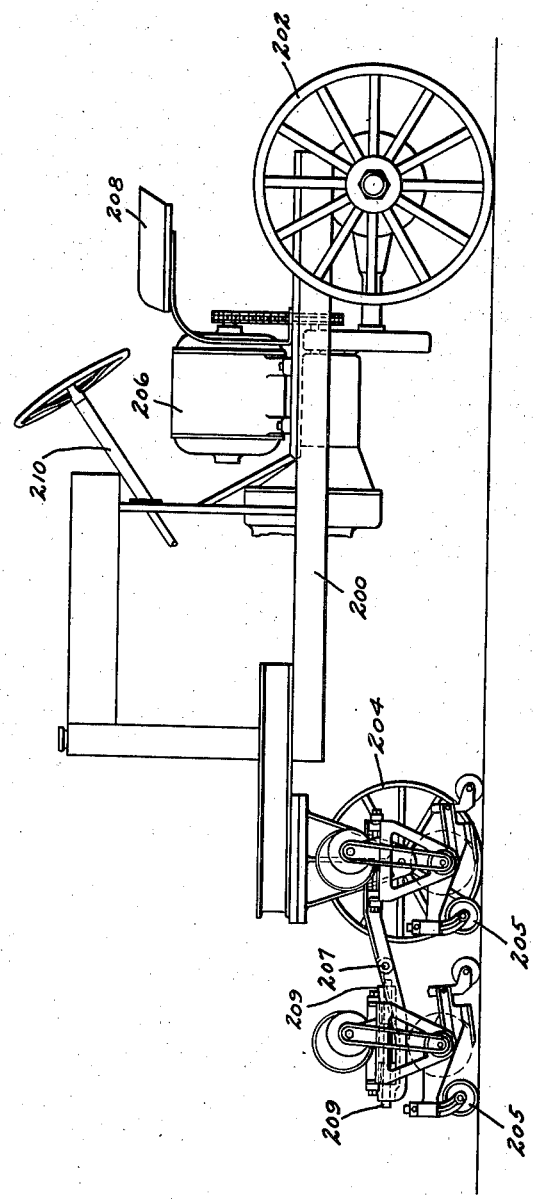
Fig. 13 is a side elevation of the tractor and gang shown in Fig. 12.

Figs. 12 and 13 disclose a tractor-propelled five-unit or seven-unit gang. The tractor comprises a frame 200 which is mounted upon a pair of rear wheels 202 and upon a single front wheel 204. The tractor is provided with an engine (not shown) which drives the generator 206 and also drives the rear wheels of the tractor for purposes of propulsion.

The gang comprises an assembly of mower units similar to that shown in Fig. 9. The various units are similar to those in Fig. 9 with the exception that their front rollers are replaced by caster wheels 205, and the units are generally of larger proportions, such as might be used for mowing fairways whereas the units of Fig. 9 are of a size adapted for putting greens on golf courses. The super frame of the center front unit is connected to the front wheel 204 of the tractor by means of transversely and longitudinally disposed pivots 207 and 209 so as to permit universal vertical movement with respect to the tractor. The rear side units are pivotally connected to the front wheel truck of the tractor in a manner similar to the connection of the units 132 and 134 of Fig. 9 to the super frame of the center unit. When seven units are desired, two additional units may be added in the rear row by means of gang frame sections pivoted on axes parallel to the direction of travel to the outer ends of the two rear unit super frames in a manner similar to the connection of the outer front units to the super frame of the center front unit, and as shown by the dotted lines in Fig. 12. Current is supplied to each of the individual motors of the individual units from the generator 206. In this case, the motor of the front center mower unit is not used for purposes of propulsion but merely serves to rotate the reel of its unit.

In operation the driver sits upon the seat 208 and steers the front wheel 204 by means of any desired mechanism (not shown) connected to the steering column 210. The steering of the front wheel 204 therefore controls the direction of the movement of the entire gang. Since none of the mower units in the gang is provided with traction members, the front and rear rows may be spaced very closely together and it is unnecessary to provide means allowing a horizontal swinging of the individual units upon the making of a turn.

In order to enable use of the hand controlled gangs at stations where electricity is not permanently available, I provide a vehicle having space for carrying the gang for the purpose of transporting it from place to place. A generator is mounted upon the vehicle and arranged to be driven by its engine. The vehicle can thus be used to carry the gang from station to station and for supplying the necessary electrical current at each station. A pivoted ramp is preferably provided to facilitate the loading and unloading of the gang which may proceed up the ramp under its own power while the generator is in operation. This arrangement is particularly adapted for use in taking care of the putting greens of golf courses.

Fig. 14 shows an automotive vehicle equipped for this purpose. Such a vehicle may conveniently be carried upon front and rear pneumatic tired wheels 211 and 212, the rear wheels 212 being propelled in the usual manner through a conventional automotive transmission (not shown) that has a neutral or out-of-gear position controlled by clutch pedal 213 and shift lever 214. The usual engine is housed under hood 215 and is connected at its forward end to drive a generator 216, which is mounted on suitable brackets from the front end of the chassis frame 217. Depending from the rear end of frame 217 are brackets 218, which carry transversely aligned pins 219 at their lower ends. Hinged upon pins 219 is platform 220 that is normally carried in horizontal position by hooks 221. When hooks 221 are disconnected from the eyes upon frame 217, the rear edge of platform 220 may be lowered to the ground, and in this position the platform resembles an inclined ramp.

During normal mowing operation, the gang mower, generally designated 222 is operated over the ground in the vicinity of the parent vehicle, the electrical socket 112 being connected by flexible cable 223 of suitable length to generator 216, and the latter being driven by engine in hood 215 while the transmission of the vehicle is in neutral position. When it is desired to transport the gang mower, it is driven onto the platform 220 while same is in the inclined position designated 220'. Hooks 224, adapted to hold the gang mower in position on the platform 220 are then engaged, after which the operator may lift on handle 4, thus elevating both the mower 222 and the platform 220 into carrying position, where they will be carried after engaging hooks 221 in the eyes on frame 217. Means are provided on the vehicle for coiling and carrying the cable 223 while transporting the gang.

I claim as my invention:

1. In a gang lawn mower having a center mower unit, and a second mower unit including a cutter frame, front and rear rolling members for supporting said cutter frame, and a super frame pivoted to said cutter frame on an axis transverse to the path of travel, a gang frame section pivoted to said super frame of the second unit on an axis parallel to the path of travel, and also pivoted to said center unit on an axis parallel to the path of travel.

2. In a gang lawn mower having a center mower unit, and a second mower unit including a cutter frame, front and rear rolling members for supporting said cutter frame, and a super frame pivoted to said cutter frame on an axis transverse to the path of travel, a rigid gang frame section pivotally connected to said super frame of the second unit at opposite sides thereof and on an axis parallel to the path of travel, said gang frame section also being pivotally connected to the center unit on an axis parallel to the path of travel.

3. In a gang lawn mower having a center mower unit, and a second mower unit including a cutter frame, front and rear rolling members for supporting said cutter frame, and a super frame pivoted to said cutter frame on an axis transverse to the path of travel, a rigid gang frame section pivotally connected to said super frame of the second unit for movement with respect thereto in a plane transverse to its path of travel only, said gang frame section also being pivotally connected to the center unit for movement with respect thereto in a single plane transverse to its path of travel.

4. In a gang lawn mower having a center mower unit provided with a cutter frame, front and rear rolling members for said cutter frame, and a super frame pivoted to said cutter frame about an axis transverse to the path of travel, and a second unit having a cutter frame, front and rear rolling members therefor, and a super frame pivoted thereto for movement about an axis transverse to the path of travel, a gang frame section pivotally connected to the super frame of the center unit for movement with respect thereto only about an axis parallel to the path of travel, said gang frame section also being connected to the super frame of the second unit for movement with respect thereto only about an axis parallel to the path of travel.

5. In a gang lawn mower having a center mower unit and a plurality of additional mower units all arranged in over-lapping positions in front and rear rows, each of said units being provided with rolling members for ground support, laterally extending gang frame sections each pivoted at one end to said center unit on an axis parallel to the direction of travel, and each pivoted at its other end to one of said additional mower units on an axis parallel to the path of travel.

6. In a gang lawn mower having a center mower unit and a plurality of additional mower units all arranged in over-lapping positions in front and rear rows, each of said units being provided with rolling members for ground support, laterally extending gang frame sections in said front and rear rows, each of said gang frame sections being pivoted at one end to said center unit on an axis parallel to the direction of travel, and each being pivoted at its other end to one of said additional mower units on an axis parallel to the path of travel.

7. In a gang lawn mower having a center mower unit and a plurality of additional mower units, all arranged in over-lapping positions in front and rear rows, each of said units having a cutter frame, front and rear rolling members for supporting the same from the ground, and a super frame pivoted to the cutter frame on an axis transverse to the path of travel, a plurality of gang frame sections each pivoted to the super frame of the center unit on an axis parallel to the path of travel and each extending laterally therefrom, each of said gang frames being pivotally connected to one of the other of said mower units on an axis parallel to the path of travel.

8. A gang lawn mower having five mower units arranged in over-lapping positions in front and rear rows, three of said units forming one row and the remaining two units forming the other row, the units in the rear row being in positions to mow the spaces between the swaths of the units in the front row, a pair of gang frame sections connecting the center unit with the end units of its row, and a second pair of gang frame sections connecting the remaining two units with said center unit, each of said gang frame sections being pivoted at one end to the center unit for movement with respect thereto about an axis parallel to the path of travel and being pivoted at its other end to one of the other units for movement with respect thereto about an axis also parallel to the path of travel.

9. A gang lawn mower comprising in combination a tractor with narrow front wheel tread, a front center mower unit and a plurality of additional mower units all arranged in over-lapping positions in front and rear rows, the front center unit being arranged to be so pushed by said tractor that its swath overlaps the front wheel tread, and having a super frame pivotally connected to the front truck of the tractor on an axis parallel to that of its front wheel, gang frame sections each pivoted at one end to the super frame of the front center unit on an axis parallel to the path of travel and each pivoted at its other end to one of the additional units on an axis also parallel to the path of travel.

10. A gang lawn mower adapted to be propelled by a tractor with narrow front wheel tread, including a front center mower unit and four additional mower units, two of said additional units being arranged one on each side of said front center unit to form therewith a front row and the other two of said additional units being arranged to form a rear row, each of said units having a cutter frame, front caster wheels and a rear roll for supporting the cutter frame, and a super frame pivoted to the cutter frame on an axis transverse to the path of travel, and four gang frames each having its outer end pivotally connected to the super frame of one of the said additional units on an axis parallel to the path of travel, the inner end of two of said gang frames being pivotally connected to the super frame of the said front center unit on axes also parallel to the path of travel, and the inner end of the other two gang frames being pivoted to the front truck of the tractor on axes parallel to the direction of travel, said front center unit being arranged to be pushed by said tractor and having its super frame pivoted thereto on an axis parallel to that of its front wheel.

11. In a gang lawn mower comprising a plurality of mower units having a center unit arranged in over-lapping positions in a front row and a rear row, each of said units including a cutter frame carrying cutters, front and rear rolling members for supporting the same, and a super frame pivoted thereto on an axis transverse to the path of travel, a drive drum at the rear of the center unit and connected thereto to propel the same, a plurality of gang frames each pivoted at one end to the center unit on an axis parallel to the path of travel and pivoted at its other end to one of the other mower units on an axis also parallel to the path of travel, a plurality of electric motors each mounted on one of the mower units, means for driving the cutters of each unit by its individual electric motor, and means for driving the drive drum by the electric motor of one of the units.

12. In a gang lawn mower comprising a plurality of mower units arranged in over-lapping positions in a front row having a center unit and a rear row, each of said units including a cutter frame carrying cutters, front and rear rolling members for supporting the same, and a super frame pivoted thereto on an axis transverse to the path of travel, a drive drum at the rear of the front center unit and connected thereto to propel the same, a plurality of gang frames each pivoted at one end to the front center unit on an axis parallel to the path of travel and pivoted at its other end to one of the other mower units on an axis also parallel to the path of travel, a plurality of electric motors each mounted on one of the mower units, means for driving the cutters of each unit by its individual electric motor, and means for driving the drive drum by the electric motor of the front center unit.

13. In a gang lawn mower comprising a plurality of mower units arranged in over-lapping positions in a rear row and a front row having a center unit, a drive drum at the rear of the front center unit and connected thereto to propel the same, a plurality of gang frames each pivoted at one end to the front center unit on an axis parallel to the path of travel and pivoted at its other end to one of the other mower units on an axis also parallel to the path of travel, a plurality of electric motors each mountd on one of the mower units, means for driving the cutters of each unit by its individual electric motor, and means for driving the drive drum by the electric motor of the front center unit.

14. In a gang lawn mower comprising a plurality of mower units arranged in over-lapping positions to form a rear row and a front row having a center unit, a drive drum at the rear of the front center unit and connected thereto to propel the same, a plurality of electric motors each mounted on one of the mower units, means for driving the cutters of each unit by its individual electric motor, and means for driving the drive drum by the electric motor of the front center unit.

15. In a gang lawn mower including a plurality of mower units arranged in over-lapping relation in front and rear rows, and a tractor for propelling said units, an individual electric motor mounted upon each of said units, driving means connecting the motor of each unit with its cutters, an electric generator carried by the tractor, and means for supplying current to each of said electric motors from said generator.

16. In a gang lawn mower including a mower unit, and a tractor for propelling the same, an electric motor mounted on said unit, driving means connecting said motor and the cutters of the unit, means for generating electricity, and and means for supplying electric current to said motor from said generating means.

17. In a gang lawn mower having a center mower unit, and a second mower unit, a gang frame pivoted adjacent one end to said center mower unit on an axis parallel to the path of travel and pivoted adjacent its other end to the second unit on another axis also parallel to the path of travel, and means for lifting said units.

18. In a gang lawn mower having a front center mower unit, and a second mower unit, a gang frame pivoted adjacent one end to said front center mower unit on an axis parallel to the path of travel and pivoted adjacent its other end to the second unit on another axis also parallel to the path of travel, a handle pivotally connected to said gang for steering the same, and means associated with the handle for lifting said units upon pivotal movement of the handle.

19. A gang lawn mower comprising a drive drum, a front center lawn mower unit arranged to be pushed by said drum and pivotally connected thereto on an axis parallel to that of the drum, a plurality of additional lawn mower units each pivotally connected to said front center unit on an axis parallel to the path of travel, a pivotally connected steering handle, and means associated with the handle for raising said units upon pivotal movement of the former with respect to the drive drum.

20. A gang lawn mower comprising a drive drum, a center lawn mower unit arranged to be pushed by said drum and pivotally connected thereto on an axis parallel to that of the drum, a plurality of additional lawn mower units each pivotally connected to said center unit on an axis parallel to the path of travel, a pivotally connected steering handle, and selectively operable means associated with the handle for raising said units upon pivotal movement of the handle.

21. A gang lawn mower comprising a drive drum, a center lawn mower unit arranged to be pushed by said drum and pivotally connected thereto on an axis parallel to that of the drum, a plurality of additional lawn mower units each pivotally connected to said center unit on an axis parallel to the path of travel, a pivotally connected steering handle, and means associated with the handle for raising said additional units upon pivotal movement of the former.

22. A gang lawn mower comprising a drive drum, a center lawn mower unit arranged to be pushed by said drum and pivotally connected thereto on an axis parallel to that of the drum, a plurality of additional lawn mower units each pivotally connected to said center unit on an axis parallel to the path of travel, a pivotally connected steering handle, and selectively operable means associated with the handle for raising the additional units upon pivotal movement of the handle in one direction, and then raising the front center unit upon further pivotal movement of the handle in the same direction.

23. A gang lawn mower comprising a drive drum, a front center lawn mower unit arranged to be pushed by said drum and pivotally connected thereto on an axis parallel to that of the drum, a plurality of additional lawn mower units each pivotally connected to said front center unit on an axis parallel to the path of travel, a steering handle pivotally connected with respect to the drive drum, selectively operable means for raising some of said additional units upon pivotal movement of the handle, means for holding such additional units in raised position, means for raising other of said additional units upon a second pivotal movement of the handle, and means for raising the front center unit upon continued pivotal movement of the handle after said second movement.

24. In a gang lawn mower having a front mower unit and a rear mower unit each provided with a rotatable cutting reel, a grass catcher mounted in the rear of the cutting reel of said rear unit, a shield positioned to the rear of the cutting reel in the front unit, and a second grass catcher mounted in front of the cutting reel of the front unit.

25. A gang lawn mower having a front center mower unit and other mower units arranged to form a rear row, each unit being provided with a revolving cutting reel, a drive drum connected to said front center unit immediately to the rear thereof, grass catchers mounted in the rear of the cutting reels of the said rear units, a shield mounted at the rear of the cutting reel of the front center unit, and a grass catcher mounted in front of the cutting reel of the front center unit.

26. A gang lawn mower having a front center mower unit and other mower units arranged to form a rear row, each unit being provided with a revolving cutting reel, a drive drum connected to said front center unit immediately to the rear thereof, individual electric motors mounted upon each of said units, means for driving the cutting reel of each unit by its individual motor, means for driving the drive drum by the motor of the front center unit, grass catchers mounted in the rear of the cutting reels of the said units forming a rear row, a shield at the rear of the cutting reel of the front center unit, and a grass catcher mounted in front of the cutting reel of the front cutting unit.

27. In a gang lawn mower having transversely disposed mower units, a gang frame section, parallel pivots at the opposite ends of the gang frame section each connecting said section to one of said mower units, said pivots extending in the direction of travel, and propelling means for one of said units connected to the gang frame section whereby both units connected to the section are propelled over the ground.

28. In a gang lawn mower having mower units transversely disposed, a gang frame section connected by a pivot to one end of a mower unit and also connected by another pivot to an adjacent unit, the axes of both pivots being substantially parallel to the direction of travel.

29. In a gang lawn mower comprising a plurality of mower units arranged in overlapping positions in front and rear rows and having a center mower unit, each of said units including a cutter frame carrying cutters, front and rear rolling members for supporting the same and a super frame pivoted thereto on an axis transverse to the path of travel, means for propelling the center unit, and a plurality of gang frames each pivoted at one end to the combined center unit and propelling means on an axis parallel to the path of travel, and each pivoted at its other end to one of the other mower units on an axis also parallel to the path of travel, whereby all of the units so connected are propelled over the ground by said propelling means.

30. A power gang lawn mower comprising in combination a tractor, a plurality of cutting units each having a super frame pivoted thereto on a transverse axis, said units being disposed in overlapping positions in closely spaced front and rear rows, connecting means including horizontally disposed universal pivots for propelling one of said units in front of a tractor front wheel, gang frame sections each connected at one end by a pivot to the front truck of the tractor and connected at its other end by a pivot to the super frame of one of the cutter units, other gang frame sections each having their ends connected by pivots to the super frames of adjacent mower units, the axes of the pivots of said gang frames all being substantially parallel to the path of travel, whereby each unit is free to operate on different elevations and to oscillate in a vertical plane but not to swing laterally.

31. A gang lawn mower including cutting units disposed in overlapping positions in closely spaced front and rear rows, and gang frame sections pivotally connecting adjacent units of each row by pivots having axes parallel and transverse to the direction of travel, whereby each unit is free to move vertically and to oscillate in a vertical plane but not to swing laterally, and whereby said gang may be steered without material damage to the turf.

32. In a gang lawn mower having a plurality of laterally spaced units each comprising unit supporting rolling elements, a rotary cutter, and a unit frame which carries cutter driving means, a rigid gang frame section connecting two laterally adjacent units by pivotal joints adjacent the opposite ends of said section on axes extending in the direction of travel and connected directly to the said unit frames.

33. A power gang lawn mower comprising a traction unit having steering means, a plurality of mower units each provided with a revolving cutter reel, gang connections connecting said mower units with the traction unit and operative to maintain said units in overlapping relation in closely spaced parallel front and rear rows, a power source located on the traction unit, and means operatively connecting said power source with the cutting reel of each mower unit thereby eliminating the necessity for traction wheels in the mower units and enabling the close spacing of the front and rear rows, said gang swinging bodily with respect to the traction unit upon operation of the steering means.

34. A power gang lawn mower comprising a plurality of mower units each including a revolving cutter reel and ground-supporting means, traction means for propelling said units over the ground, gang connections for the units and traction means operative to maintain said units in overlapped relation in closely spaced parallel front and rear rows, and a common source of power independent of the unit ground-supporting means for revolving said cutter reels thereby eliminating the necessity for traction wheels in the units and enabling close spacing of the front and rear rows.

35. A walk-type power gang lawn mower comprising a traction unit with rearwardly extending steering handle and a traction drum, a revolving cutting reel mounted ahead of said drum and provided with ground supporting means, other cutting reels placed rearwardly of the first mentioned reel and also provided with ground supporting means, means connecting all of said reels with said drum and operative to maintain all of the said reels in over-lapping relation, a common source of power, and a plurality of transmission means for operating said traction drum and said reels from said source.

36. A power gang lawn mower as claimed in claim 35 wherein there is a shield behind the cutting reel which is mounted ahead of the drum, and wherein the other reels are arranged laterally of the drum rearwardly of the forward cutting reel, and wherein there is a grass catcher behind one of the last mentioned reels.

37. In a power gang lawn mower comprising front and rear rows of units having overlapping swaths each provided with ground supports and a revolving cutting reel, a traction drum immediately behind a reel of the front row, a reel of the rear row offset from said reel of the front row and overlapping the cut thereof, a grass catcher immediately behind said reel of the rear row, a shield between said reel of the front row and the traction drum, and a grass catcher in front of said reel.

38. A power gang lawn mower as claimed in claim 37 wherein there is a source of power, means to operate said traction drum, and means transmitting power from said source to said reels to operate the same.

39. In a gang lawn mower including a tractor having a steerable element, a plurality of mower units connected to said element and resting individually upon the ground, an electric motor mounted on each of said units, driving means connecting said motor and the cutters of each unit, an electric generator movable with said gang, and electrical connections between the generator and the motors, whereby the cutters of the units are operated irrespective of the movements of the steerable elements.

40. In combination, a vehicle having an engine and vehicle propelling means operable by said engine and disengageable therefrom, an electric generator on said vehicle operable by said engine, an electrically propellable lawn mower, an elongated flexible electrical connection between the generator and the lawn mower, and transporting means on said vehicle for receiving and supporting said lawn mower while the vehicle moves, whereby electrical propulsion of the lawn mower onto said transporting means is possible.

41. A power gang lawn mower including a tractor having a drum, mower units front and rear operably associated with said drum to cut overlapping swaths, each unit being provided with ground supports and a rotatable cutter reel, motive means on the tractor, and means by which said motive means drives said reels.

42. A power gang lawn mower having a drum, mower units front and rear operably associated with said drum to cut overlapping swaths, each unit provided with ground supports and a rotatable cutter reel, a grass catcher mounted in the rear of the cutter reel of the rear unit, a shield mounted to the rear of the cutter reel of the front unit and a second grass catcher mounted in front of the cutter reel of the front unit.

43. A power gang lawn mower, having a ground engaging drum, mower units front and rear operably associated with said drum to cut overlapping swaths, each unit being provided with ground supports and a rotatable cutter reel, a grass catcher mounted in the rear of the cutter reel of the rear unit, a shield positioned to the rear of the cutter reel of the front unit, and a second grass catcher mounted in front of the cutter reel of the front unit.

44. A power gang lawn mower comprising a propelling tractor with a power source and a steerable rolling element, mowing units having revolving cutting reels, said units disposed laterally from said element and each provided with ground supporting means but having no reel-driving ground wheels, another cutting reel also provided with ground supporting means but having no driving ground wheels and closely spaced in the direction of travel from said first mentioned cutting reels, means connecting said reels with said rolling element and operative to maintain all reels in overlapping relation and in closely spaced parallel rows while the element, reels and connecting means are being steered, and a plurality of transmission means for operating said reels from said power source.

45. In a lawn mower, the combination of, a main frame, a rotary cutter connected to the frame in operative position in front thereof, a support comprising a ground roller located immediately behind the front cutter and wholly within the swath thereof and a bearing bracket for the roller on said frame, a rear rotary cutter connected to the frame in a position laterally spaced with respect to the front cutter and overlapping the swath thereof, a shield behind the front cutter, a grass catcher in front of the front cutter and extending laterally beyond both sides thereof, and a grass catcher behind the rear cutter and extending laterally beyond both sides thereof.

46. In a lawn mower, the combination of a main frame, a rotary cutter connected to the frame in operative position in front thereof, a support comprising a ground roller located immediately behind the front cutter and wholly within the swath thereof and a bearing bracket for the roller on said frame, driving means extending from the frame to the roller, a rotary cutter connected to the frame rearwardly of the front cutter in a position laterally spaced with respect to said front cutter and overlapping the swath thereof, a shield behind the front cutter, a grass catcher in front of the front cutter and extending laterally beyond both sides thereof, a grass catcher behind the rear cutter and extending laterally beyond both sides thereof, and a common connection on said frame for operating said cutters and driving means.

47. A gang lawn mower comprising a plurality of mowing units, each having a revolving reel and disposed relatively to each other to cut overlapping swaths and arranged in front and rear rows that are closely spaced in the direction of travel, a shield immediately behind a reel in the front row and a grass catcher in front of said reel and a grass catcher behind a reel in the rear row.

JOHN S. CLAPPER.